(12) United States Patent
Huh et al.

(10) Patent No.: US 10,319,267 B2
(45) Date of Patent: Jun. 11, 2019

(54) DISPLAY DEVICE

(71) Applicant: SAMSUNG DISPLAY CO., LTD., Yongin-si, Gyeonggi-Do (KR)

(72) Inventors: Su Jung Huh, Yongin-si (KR); Jae Joong Kwon, Suwon-si (KR); Beom Shik Kim, Yongin-si (KR)

(73) Assignee: SAMSUNG DISPLAY CO., LTD., Yongin-Si, Gyeonggi-Do (KR)

( * ) Notice: Subject to any disclaimer, the term of this patent is extended or adjusted under 35 U.S.C. 154(b) by 0 days.

(21) Appl. No.: 15/867,001

(22) Filed: Jan. 10, 2018

(65) Prior Publication Data

US 2018/0240383 A1 Aug. 23, 2018

(30) Foreign Application Priority Data

Feb. 23, 2017 (KR) .................. 10-2017-0024189

(51) Int. Cl.
*G09G 3/00* (2006.01)
*G02B 27/22* (2018.01)
(Continued)

(52) U.S. Cl.
CPC ......... *G09G 3/003* (2013.01); *G02B 27/2214* (2013.01); *G09G 3/2003* (2013.01);
(Continued)

(58) Field of Classification Search
CPC ........... G09G 3/003; G09G 2320/0626; G09G 3/3685; G09G 3/2003; G09G 3/3674;
(Continued)

(56) References Cited

U.S. PATENT DOCUMENTS

2007/0052699 A1* 3/2007 Karman ............... H04N 13/305
345/419
2013/0278736 A1* 10/2013 Saito ..................... G09G 3/003
348/59
(Continued)

FOREIGN PATENT DOCUMENTS

| JP | 2003-161912 | 6/2003 |
| JP | 5720421 | 4/2015 |
| KR | 10-1120516 | 2/2012 |

*Primary Examiner* — Abhishek Sarma
(74) *Attorney, Agent, or Firm* — F. Chau & Associates, LLC

(57) ABSTRACT

A display device includes a display portion having a plurality of pixels; a lens array portion enables light emitted from the plurality of pixels to travel into a plurality of viewpoint areas and thus an image is viewed in the plurality of viewpoint areas; a data compensation circuit generating a compensation image signal by applying a compensation value according to a viewing angle to an input image signal that includes luminance information of the plurality of pixels; and a data driver applying a data voltage to the plurality of pixels according to an image data signal generated based on the compensation image signal, wherein the lens array portion includes a lens providing local focusing to two or more pixels, and the data compensation circuit applies a compensation value according to a viewing angle from a pixel corresponding a center of the lens to two or more different side directions.

22 Claims, 12 Drawing Sheets

(51) Int. Cl.
  *G09G 3/20* (2006.01)
  *G09G 3/36* (2006.01)
  *H04N 13/324* (2018.01)
  *H04N 13/398* (2018.01)
  *H04N 13/307* (2018.01)
  *H04N 13/351* (2018.01)
  *H04N 13/305* (2018.01)

(52) U.S. Cl.
  CPC ......... *G09G 3/3674* (2013.01); *G09G 3/3685* (2013.01); *H04N 13/307* (2018.05); *H04N 13/324* (2018.05); *H04N 13/351* (2018.05); *H04N 13/398* (2018.05); *G09G 2320/0626* (2013.01); *H04N 13/305* (2018.05)

(58) Field of Classification Search
  CPC .. H04N 13/305; H04N 13/351; H04N 13/307; H04N 13/398; H04N 13/324; G02B 27/2214
  See application file for complete search history.

(56) References Cited

U.S. PATENT DOCUMENTS

2016/0359112 A1  12/2016  Wang et al.
2016/0359120 A1  12/2016  Li

\* cited by examiner

DISPLAY DEVICE

CROSS-REFERENCE TO RELATED APPLICATION

This application claims priority from and the benefit of Korean Patent Application No. 10-2017-0024189 filed in the Korean Intellectual Property Office on Feb. 23, 2017, the entire contents of which are incorporated herein by reference.

TECHNICAL FIELD

The present inventive concept relates to a display device. More particularly, the present inventive concept relates to a display device that can display a 3D stereoscopic image.

DISCUSSION OF THE RELATED ART

In recent years, as display device technology has developed, a 3D stereoscopic image display device has attracted attention and various 3D image display methods have been researched.

In the 3D stereoscopic image display technology, a binocular parallax, which is the biggest factor in recognition of 3D, is used to represent a stereoscopic effect of an image. A 3D image display device can be classified variously, and may be classified, for example, into a stereoscopic 3D image display device and an autostereoscopic 3D image display device. In the case of the stereoscopic 3D image display device, a user may feel uncomfortable because the user typically to wear spectacles to view the 3D image(s) (as experienced in theaters). Thus, the development of the autostereoscopic 3D image display device is increasing as users will find it more convenient by not having to wear special spectacles.

The autostereoscopic 3D image display device can be classified into a multi-viewpoint type with which a user can observe a 3D image without using spectacles in a specific viewing angle area, a super multi-viewpoint type, an integrated image type that provides a 3D image close to actual 3D reality, a volumetric image type, a hologram method, and the like.

The multi-viewpoint type autostereoscopic 3D image display device can be further classified into a spatial division type in which the entire resolution is spatially divided by using a lens array, and a temporal division type in which several viewpoint images are temporally quickly displayed while maintaining the entire resolution.

The above information disclosed in this discussion section is only provided for enhancement of understanding of the inventive concept and therefore it is not an admission of prior art and may contain information that does not constitute that is already known in this country to a person of ordinary skill in the art.

SUMMARY

In the multi-viewpoint type, an image viewed from a front viewpoint of a display has a relatively small angle with respect to light emitted from pixels and thus is viewed with luminance and color as intended, but an image view at side viewpoints of a display has a relatively large angle with respect to light emitted from pixels and thus is viewed with levels of luminance and color that may be different than when viewed from the front viewpoint and different than intended. Accordingly, a range that a pixel of an image viewed at the side viewpoint is reduced compared to the image viewed at the front viewpoint, and the luminance of the image viewed at the side viewpoint may be lower than the luminance of the image viewed at the front viewpoint.

In addition, a path of light emitted from the pixels that display the image at the front viewpoint and a path of light emitted from the pixels that display the image at the side viewpoint are different from each other, and thus the image of the side viewpoint may be affected by light interference that is different from light interference that affects the image of the front viewpoint.

For example, among light emitted from a light emission portion of a pixel, light having passed through a cover glass and the like and light that is re-reflected, experiences constructive interference and destructive interference and thus the light can be viewed. In addition, constructive interference and destructive interference of the light may be severe when viewing the image at the side viewpoint as compared to viewing the image at the front viewpoint. The constructive interference and destructive interference of light may also vary depending on a wavelength of light, and accordingly, a color of the image of the side viewpoint may be viewed to be different from a color of the image of the front viewpoint.

The inventive concept is provided to solve such a problem by providing a 3D image display device that can solve problems that luminance, colors, and the like are viewed differently depending on a viewing angle of the display device.

A display device according to an embodiment of the present inventive concept includes: a display portion including a plurality of pixels; a lens array portion that enables light emitted from the plurality of pixels to travel into a plurality of viewpoint areas and thus an image is viewed in the plurality of viewpoint areas; a data compensation circuit generating a compensation image signal by applying a compensation value according to a viewing angle to an input image signal that includes luminance information of the plurality of pixels; and a data driver applying a data voltage to the plurality of pixels according to an image data signal generated based on the compensation image signal, wherein the lens array portion includes a lens providing local focusing to two or more pixels, and the data compensation circuit applies a compensation value according to a viewing angle from a pixel corresponding a center of the lens to two or more different side directions.

The plurality of pixels may be arranged in a matrix format along rows that are parallel with a first direction and columns that are parallel with a second direction, and the two or more different side directions may include a first side direction that matches the first direction and a second side direction that matches the second direction.

The two or more different side directions of the pixel arrangement may further include a third side direction between the first direction and the second direction.

Each of the two or more different side directions may include a direction of a line that connects a pixel disposed at the center of the lens and other pixels included in a domain corresponding to the lens.

The viewing angle may be proportional to a distance between the pixel disposed at the center of the lens and the other pixels.

The compensation value may include a first compensation value determined by a ratio of a reference luminance ratio with respect to a luminance ratio of red, the reference luminance ratio is a ratio of side luminance according to a viewing angle with respect to front luminance of a reference display device, and the luminance ratio is side luminance according to a viewing angle with respect to front luminance of the display device.

The data compensation circuit may generate the compensation image signal by multiplying an input image signal including luminance information of red by the first compensation value.

The compensation value may further include: a second compensation value determined by a ratio of a reference luminance ratio with respect to a luminance ratio of green; and a third compensation value determined by a ratio of a reference luminance ratio with respect to a luminance ratio of blue.

The data compensation circuit may generate the compensation image signal by multiplying an input image signal including luminance information of green by the second compensation value and multiplying an input image signal including luminance information of blue by the third compensation value.

The data compensation circuit may store a lookup table where compensation values with respect to viewing angles are summarized.

The data compensation circuit may store a lookup table where the compensation values are summarized with respect to locations of the respective pixels.

The compensation value may include: a first compensation value which is an inverse value of the luminance ratio of red; a second compensation value which is an inverse value of the luminance ratio of green; and a third compensation value which is an inverse value of the luminance ratio of blue, and the luminance ratio may be a ratio of side luminance according to a viewing angle with respect to front luminance of the display device.

The third compensation value may be greater than or equal to the second compensation value, and the second compensation value may be greater than or equal to the first compensation value.

The data compensation circuit may generate the compensation image signal by multiplying an input image signal including luminance information of red by the first compensation value, multiplying an input image signal including luminance information of green by the second compensation value, and multiplying an input image signal including luminance information of blue by the third compensation value.

A display device according to an embodiment of the present inventive concept includes: a display portion including a plurality of pixels; a lens array portion in which light emitted from the plurality of pixels passes through to a plurality of viewpoint areas from which an image is viewed; a data compensation circuit configured to generate a compensation image signal by application of a compensation value according to a viewing angle to an input image signal that includes luminance information of the plurality of pixels; and a data driver configured to apply a data voltage to the plurality of pixels according to an image data signal generated based on the compensation image signal, wherein the lens array portion includes a lens that provides local focusing to two or more pixels and a domain corresponding to the lens overlaps two or more pixels, and the lens array portion includes a plurality of block areas arranged in a row along a center axis of the domain and pixels corresponding to each block area display an image corresponding to different viewpoint areas, and the compensation value includes a first compensation value determined by a ratio of a reference luminance ratio with respect to a luminance ratio of red, the reference luminance ratio is a ratio of side luminance according to a viewing angle with respect to front luminance of a reference display device, and the luminance ratio is a ratio of side luminance according to a viewing angle with respect to front luminance of the display device.

The data compensation circuit may generate the compensation image signal by multiplying an input image signal including luminance information of red by the first compensation value.

The compensation value may further include: a second compensation value determined by a ratio of a reference luminance ratio with respect to a luminance ratio of green; and a third compensation value determined by a reference luminance ratio with respect to a luminance ratio of blue.

The data compensation circuit may be configured to generate the compensation image signal by multiplying an input image signal including luminance information of green by the second compensation value and multiplying an input image signal including luminance information of blue by the third compensation value.

The compensation value may include: a first compensation value which is an inverse value of the luminance ratio of red; a second compensation value which is an inverse value of the luminance ratio of green; and a third compensation value which is an inverse value of the luminance ratio of blue, and the luminance ratio may be a ratio of a side luminance according to a viewing angle with respect to front luminance of the display device.

The third compensation value may be greater than or equal to the second compensation value, and the second compensation value may be greater than or equal to the first compensation value.

According to one or more embodiments of the present inventive concept, the different ways that luminance and colors may be viewed according to a viewing angle in a 3D image display device can be corrected.

A method of operating a display device includes providing a display portion including a plurality of pixels, and a lens array portion in which light emitted from the plurality of pixels passes through toward a plurality of viewpoint areas from which an image is viewed; determining, by a data compensation circuit, a compensation image signal according to a viewing angle from which the image is viewed, in which the input image signal includes luminance information of the plurality of pixels; and applying, by a data driver, a data voltage to the plurality of pixels according to an image data signal; locally focusing, by a lens of the lens array portion, two or more pixels of the plurality of pixels, and applying, by the data compensation circuit, a compensation value to the input image signal according to a viewing angle from a pixel corresponding to a center of the lens to two or more different side directions.

The method may include that the determining of the compensation image signal include retrieving the compensation value to be applied to the input image signal from a lookup table in a memory.

BRIEF DESCRIPTION OF THE DRAWINGS

FIG. 7 to FIG. 9 are graphs provided for description of a method for compensating an input image signal according to an embodiment of the present inventive concept in which:

FIG. 7 shows values of a luminance ratio versus a viewing angle for red;

FIG. 8 shows values of a luminance ratio versus a viewing angle for green;

FIG. 9 shows values of a luminance ratio versus a viewing angle for blue;

DETAILED DESCRIPTION

Figure 1:
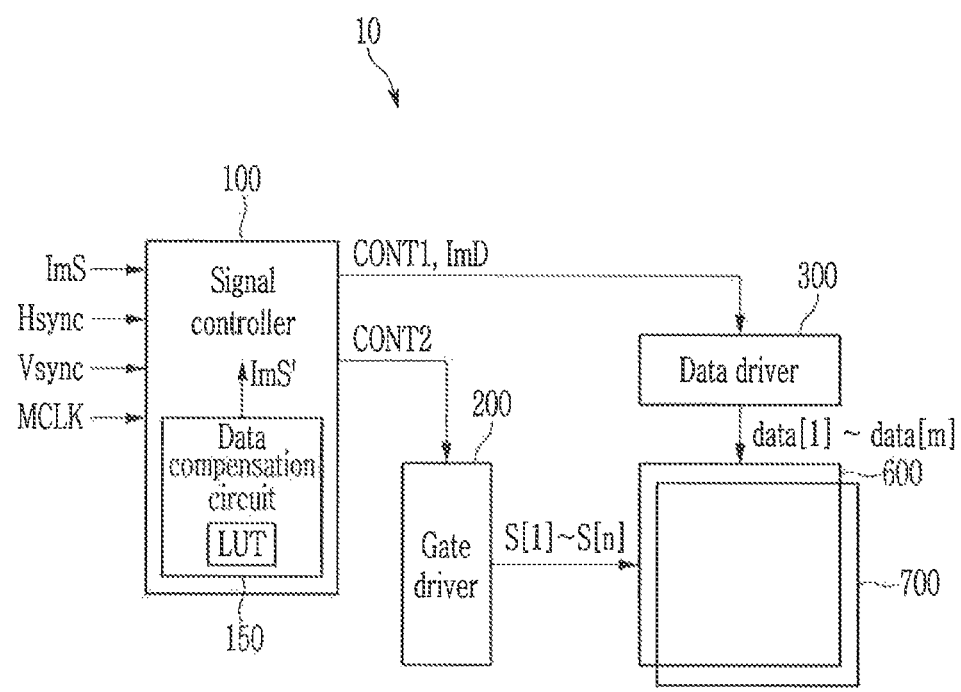
FIG. 1 is a schematic block diagram of a display device according to an embodiment of the present inventive concept.

Hereinafter, one or more embodiments of the present inventive concept will be described in more detail with reference to the accompanying drawings. As those skilled in the art will understand, the described embodiments may be modified in various different ways, all without departing from the spirit or scope of the present inventive concept.

The drawings and description are to be regarded as illustrative in nature and not restrictive. Like reference numerals designate like elements throughout the specification.

In addition, the size and thickness of each configuration shown in the drawings are arbitrarily drawn for better illustrative purposes and for ease of description, but the present inventive concept is not limited thereto. In the drawings, the thickness of layers, films, panels, regions, etc., are exaggerated for clarity.

It will be understood that when an element such as a layer, film, region, or substrate is referred to as being "on" another element, it can be directly in contact on the other element, or there may be intervening elements also be present. In contrast, when an element is referred to as being "directly on" another element, there are no intervening elements present. The word "on" does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

In this specification, the phrase "on a plane" refers to viewing a target portion from the top, and the phrase "on a cross-section" refers to viewing a cross-section formed by vertically cutting a target portion from the side.

Hereinafter, referring to FIG. 1, a display device according to an embodiment of the present inventive concept will be described.

FIG. 1 is a schematic block diagram of a display device according to an embodiment of the present inventive concept.

Referring to FIG. 1, a display device 10 includes, for example, a signal controller 100, a gate driver 200, a data driver 300, a display portion 600, and a lens array portion 700. The signal controller 100 may include a data compensation circuit 150, but the inventive concept is not limited to the configuration shown in FIG. 1. For example, the data compensation circuit 150 may be separately provided rather than being included in the signal controller 100.

The display portion 600 is a display area including a plurality of pixels that may be arranged in a matrix. In the display portion 600, there are a plurality of gate lines that extend substantially in a row direction and are substantially parallel with each other and a plurality of data lines that extend substantially in a column direction and are almost parallel with each other, the gate lines and the data lines are formed to be connected to the pixels. Each of the plurality of pixels may emit light comprised of primary colors. The primary colors may include, for example, red, green, and blue, and the three primary colors are spatially or temporally combined to obtain a desired color. A color may be displayed by a red pixel, a green pixel, and a blue pixel, and the red pixel, the green pixel, and the blue pixel may be collectively referred to as one pixel. Depending on the embodiment of the inventive concept, the plurality of pixels may display cyan, magenta, yellow, and white-based colors.

Still referring to FIG. 1, the signal controller 100 receives an input image signal ImS and a synchronization signal input from an external device. The input image signal ImS includes luminance information regarding a plurality of pixels that will display the image. The luminance has a predetermined number of gray levels, for example, 1024 ($=2^{10}$), 256 ($=2^8$), or 64 ($=2^6$). The synchronization signal includes a horizontal synchronization signal Hsync, a vertical synchronization signal Vsync, and a main clock signal MCLK.

The data compensation circuit 150 generates a compensation image signal ImS' by applying a compensation value according to a viewing angle to the input video signal ImS. Specifically, the data compensation circuit 150 may include a memory that includes an address corresponding to a location of each of the plurality of pixels, divide the input image signal ImS into units respectively corresponding to the plurality of pixels and respectively store them in the corresponding addresses in the memory, and generate a compensation image signal ImS' by applying (e.g., by multiplying) a compensation values determined according to a location of each pixel to the corresponding input image signal ImS. Compensation values with respect to locations of pixels may be stored as a lookup table LUT in the data compensation circuit 150. The compensation values with respect to the locations of the pixels may be determined according to viewing angles, and this will be described later in detail.

The signal controller 100 generates a first driving control signal CONT1, a second driving control signal CONT2, and an image data signal ImD based on the compensation image signal ImS', and the externally received a horizontal synchronization signal Hsync, a vertical synchronization signal Vsync, and a main clock signal MCLK.

With continued reference to FIG. 1, the signal controller 100 divides the compensation image signal ImS' by frame units according to the vertical synchronization signal Vsync, and divides the compensation image signal ImS' by gate line units according to the horizontal synchronization signal Hsync to generate the image data signal ImD. The signal controller 100 transmits the image data signal ImD and the first driving control signal CONT1 to the data driver 300. The signal controller 100 transmits the second driving control signal CONT2 to the gate driver 200.

The gate driver 200 is connected to a plurality of gate lines, and generates a plurality of gate signals S[1] to S[n]

according to the second driving control signal CONT2 received from the signal controller 100. The gate driver 200 may sequentially apply gate signals S[1] to S[n] of a gate-on voltage to the plurality of gate lines.

The data driver 300 is connected to a plurality of data lines, and performs sampling and holding on the image data signal ImD according to the first driving control signal CONT1, and transmits a plurality of data voltages data[1] to data[m] to a plurality of data lines. The data driver 300 is synchronized with a time when the plurality of gate signals S[1] to S[n] respectively becomes the gate-on voltage, and thus applies the plurality of data voltages data[l] to data[m] according to the image data signal ImD to the plurality of data lines.

The lens array portion 700 overlaps the display portion 600, and allows light emitted from the plurality of pixels to advance to a plurality of viewpoint areas to be displayed, so that an image is viewed in the plurality of viewpoint areas. Different images may be displayed in the plurality of viewpoint areas through the lens array portion 700, and accordingly, for example, a 3D stereoscopic image can be viewed. The structure of the lens array portion 700 may be a sheet including a plurality of microlenses or a plurality of lenticular lenses providing local focusing with respect to a pixel group including two or more pixels, or the lens array portion may be a switchable lens panel that can form a plurality of microlenses or a plurality of lenticular lenses.

Hereinafter, referring to FIG. 2, FIG. 3, and FIG. 4, the lens array portion and a method for displaying a 3D stereoscopic image using the lens array panel according to an embodiment of the inventive concept will now be described.

Figure 2:
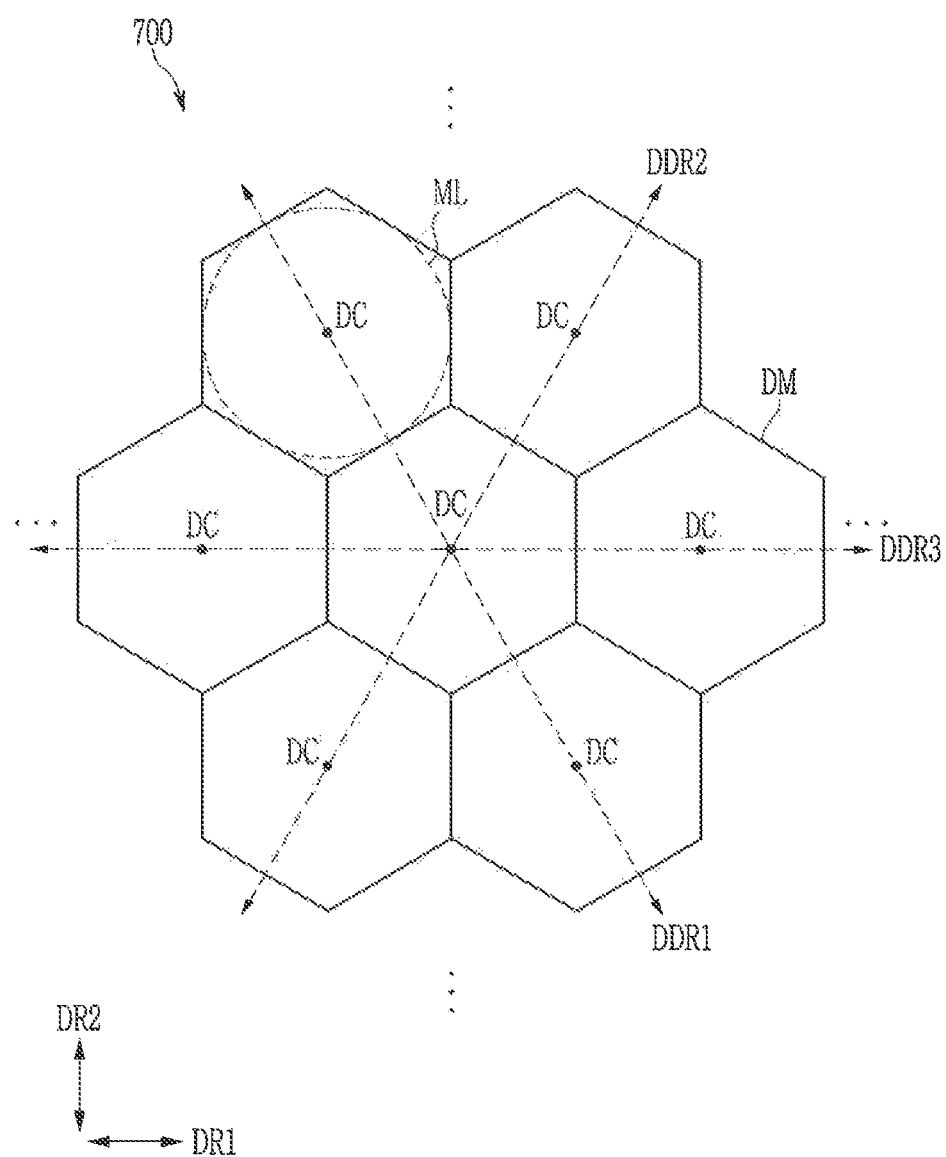
FIG. 2 shows a lens array portion of FIG. 1 according to an embodiment of the inventive concept.

FIG. 2 shows the lens array portion according to an embodiment of the inventive concept.

Referring to FIG. 2, the lens array portion 700 may be partially or wholly partitioned into a plurality of domains DM on a plane that is parallel with a first direction DR1 and a second direction DR2. Each domain DM is an area that corresponds to a single lens that provides the local focusing. The shape of each domain DM may be one of various polygons.

For example, as shown in FIG. 2, the shape of each domain DM may be a hexagon. However, the inventive concept is not limited thereto and the shape of the domain may be, for example, a quadrangle, a pentagon, etc., and the like. When one domain DM has n angles (n is a natural number greater than 3), each domain DM may be adjacent to n domains DM at its periphery, and two adjacent domains may be adjacent to each other while sharing one side.

For example, according to the inventive concept, sides of one domain DM may be equal to each other as shown in the drawing, and thus the domain may be a regular polygon. However, the lengths of the sides of each domain DM are not limited thereto, and each domain DM may have sides having different lengths.

The size and the shape of each domain DM included in the lens array portion 700 may be constant, but this is not restrictive. The lens array portion 700 may include domains DM each having a different shape depending on locations. In addition, the shape of the domain DM is not limited to a polygon, and may have an atypical shape. In this case, the shapes of the plurality of domains DM included in the lens array portion 700 may not be constant depending on locations.

Hereinafter, an embodiment of the inventive concept will be described in which the lens array portion 700 includes a plurality of microlenses ML, and each of the microlenses ML corresponds to each of the hexagonal domains DM.

The plurality of domains DM may be adjacent to each other in a first domain direction DDR1, a second domain direction DDR2, and a third domain direction DDR3. The domain directions DDR1, DDR2, and DDR3 are directions where adjacent domains DM are arranged, and may be directions that connect centers DC of adjacent domains DM. A center DC of each domain DM may be various centers such as a mass center of the domain DM or a point of intersection of two or more lines that are symmetrical reference of the shapes of the domains DM. The first domain direction DDR1 and the second domain direction DDR2 may be slanted with respect to the first direction DR1 or the second direction DR2. The third domain direction DDR3 may be the same direction as the first direction DR1.

Figure 3:
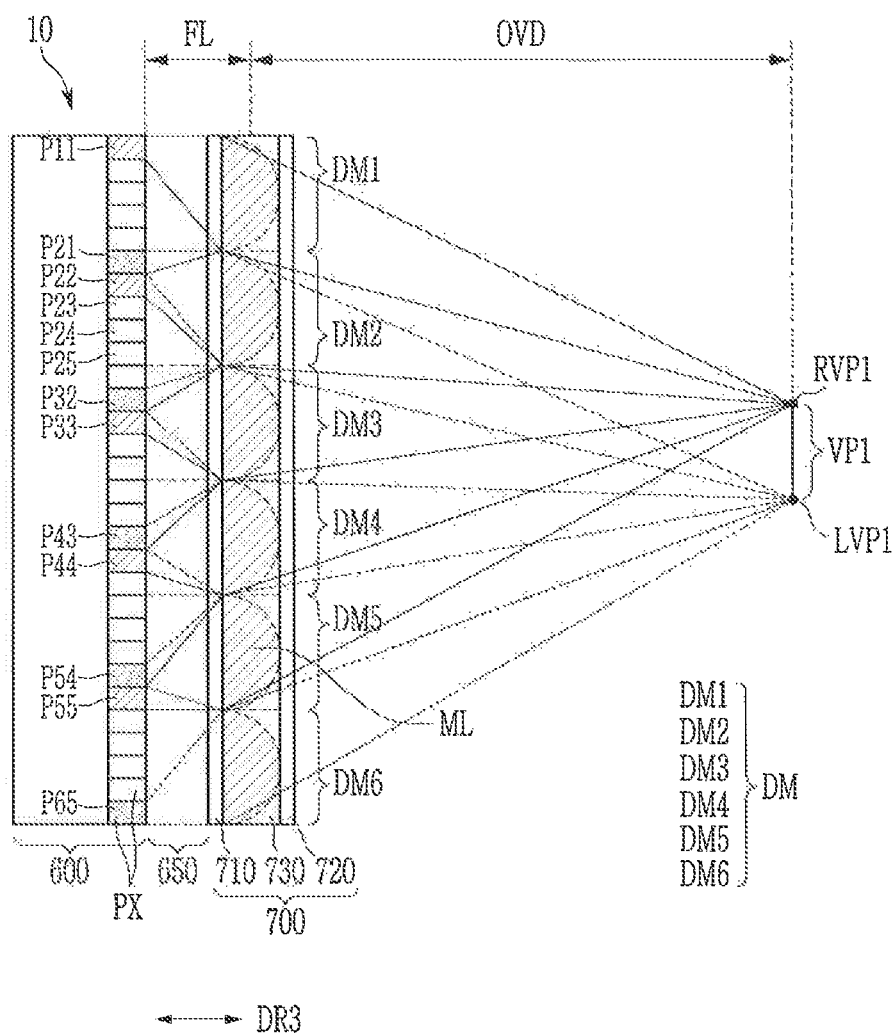
FIG. 3 shows a method for the display device of FIG. 1 for displaying a 3D stereoscopic image.

FIG. 3 shows a method for displaying a 3D stereoscopic image by the display device of FIG. 1. In FIG. 3, the display device is viewed on a cross-section formed by the third direction DR3 and any one of the domain directions DDR1, DDR2, and DDR3 and a cross-section formed by the third direction DR3 and one of the first direction DR1 and the second direction DR2. The third direction DR3 is perpendicular to the first direction DR1 and the second direction DR2.

Referring to FIG. 3, the display device 10 includes the display portion 600 and the lens array portion 700, and the lens array portion 700 is disposed between a first viewer VP1 and the display portion 600. An intermediate layer 650 may be disposed between the display portion 600 and the lens array portion 700. The intermediate layer 650 may be, for example, an optical adhesive, and in this case, the display portion 600 and the lens array portion 700 may be bonded to each other by the intermediate layer 650. As the intermediate layer 650, an optically clear resin (OCR) or an optically clear adhesive (OCA) may be used. As a material of the intermediate layer 650, a material that is less affected by a refractive index and has high transmittance may be used. For example, a material of the intermediate layer 650 may include an acryl-based polymer, a silicon-based polymer, or a urethane-based polymer, but this is not restrictive. Various transparent and insulating materials may be used.

When the lens array portion 700 is formed on the display portion 600 continuously through a thin film process after forming the display portion 600, the intermediate layer 650 may include, for example, an organic insulation material or an inorganic insulation material. However, when the lens array portion 700 is formed on a separate substrate and then attached to the display portion 600, the intermediate layer 650 may be various adhesives.

The lens array portion 700 may include or generate a plurality of lenses ML having a convex side that is convex to the third direction DR3 and a concave side that is concave to the third direction DR3. As previously described, the lens array portion 700 may be a sheet or a liquid crystal lens panel. FIG. 3 illustrates a case that the lens array portion 700 is provided as a liquid crystal lens panel. When the lens array portion 700 is a lens panel that includes a first electrode portion 710 and a second electrode portion 720 that face each other, and a liquid crystal layer 730 disposed between the first electrode portion 710 and the second electrode portion 720. The first electrode portion 710 and the second electrode portion 720 are respectively applied with different voltages, and accordingly, liquid crystal molecules of the liquid crystal layer 730 are rearranged by an electric field formed by a voltage difference between the first electrode portion 710 and the second electrode portion 720 such that the plurality of lenses ML can be formed.

The display portion 600 and the lens array portion 700 may be disposed apart from each other so that a distance between a display side, where an image is displayed in the display portion 600, and a cross-sectional center of the lens ML of the lens array portion 700 becomes a focal distance FL of the lens ML. A distance between the display portion 600 and the lens array portion 700 may be adjusted by adjusting a thickness of the intermediate layer 650 or a thickness of at least one of a substrate, a film, and the like included in the display portion 600 or the lens array portion 700.

Each domain DM of the lens array portion 700 overlaps two or more pixels PX of the display portion 600, and light of an image displayed by the pixels PX overlapping each domain DM may pass through the corresponding domain DM. Light incident from the pixels PX corresponding to each domain DM is refracted at different angles and travels in different directions depending on the incident position in the domain DM. That is, pixels PX corresponding to each domain DM may display an image corresponding to different viewpoint areas.

A distance from the center of the lens ML of the lens array portion 700 on a cross-section to a spot where an optimal stereoscopic image can be viewed is referred to as an optimal viewing distance OVD.

In addition, a case in which a first viewer VP1 (or a first viewpoint area) having a left eye LVP1 or a right eye RVP1 is located in the optimal viewing distance OVD will now be described. Light emitted from a 2-1 pixel P22, a 2-3 pixel P23, a 2-4 pixel P24, and a 2-5 pixel P25 corresponding to the second domain DM2 are respectively refracted at different angles in the lenses ML of the second domain DM2 and travels in different directions. The light emitted from the 2-1 pixel P21 may be incident on the left eye LVP1 of the first viewer VP1, and the light emitted from the 2-2 pixel P22 may be incident on the right eye RVP1 of the first viewer VP1. The reason for the light being incident on different viewers is because the light emitted from the 2-2 pixel P22 is refracted at an angle that is smaller than an angle at which the light emitted from the 201 pixel P21 is refracted in the lenses ML in the second domain DM2. For example, as the position of the pixel is changed, the angle of refraction of the lens is changed and thus light can be incident on different places.

Similarly, the light emitted from the 1-1 pixel P11 may be incident on the right eye RVP1 of the first viewer VP1. The light emitted from the 3-2 pixel P32 may be incident on the left eye LVP1 of the first viewer VP1, and the light emitted from the 3-3 pixel P33 may be incident on the right eye RVP1 of the first viewer VP1. The light emitted from the 4-3 pixel P43 may be incident on the left eye LVP1 of the first viewer VP1, and the light emitted from the 4-4 pixel P44 may be incident on the right eye RVP1 of the first viewer VP1. The light emitted from the 5-4 pixel P54 may be incident on the left eye VP1 of the first viewer VP1, and the light emitted from the 5-5 pixel P55 may be incident on the right eye RVP1 of the first viewer VP1. The light emitted from the 6-5 pixel P65 may be incident on the left eye LVP1 of the first viewer VP1.

The right eye RVP1 of the first viewer VP1 recognizes lights emitted from the 1-1 pixel P11, the 2-2 pixel P22, the 3-3 pixel P33, the 4-4 pixel P44, and the 5-5 pixel P55, and the left eye LVP1 of the first viewer VP1 may recognize lights emitted from the 2-1 pixel P21, the 3-2 pixel P32, the 4-3 pixel P43, the 5-4 pixel P54, and the 6-5 pixel P65. The right eye RVP1 and the left eye LVP1 of the first viewer VP1 recognize an image of different pixels PX so that the first viewer VP1 can perceive the depth and a three-dimensional effect of the image.

The right eye RVP1 and the left eye LVP1 may be replaced with different viewers located in different viewpoint areas.

Figure 4:
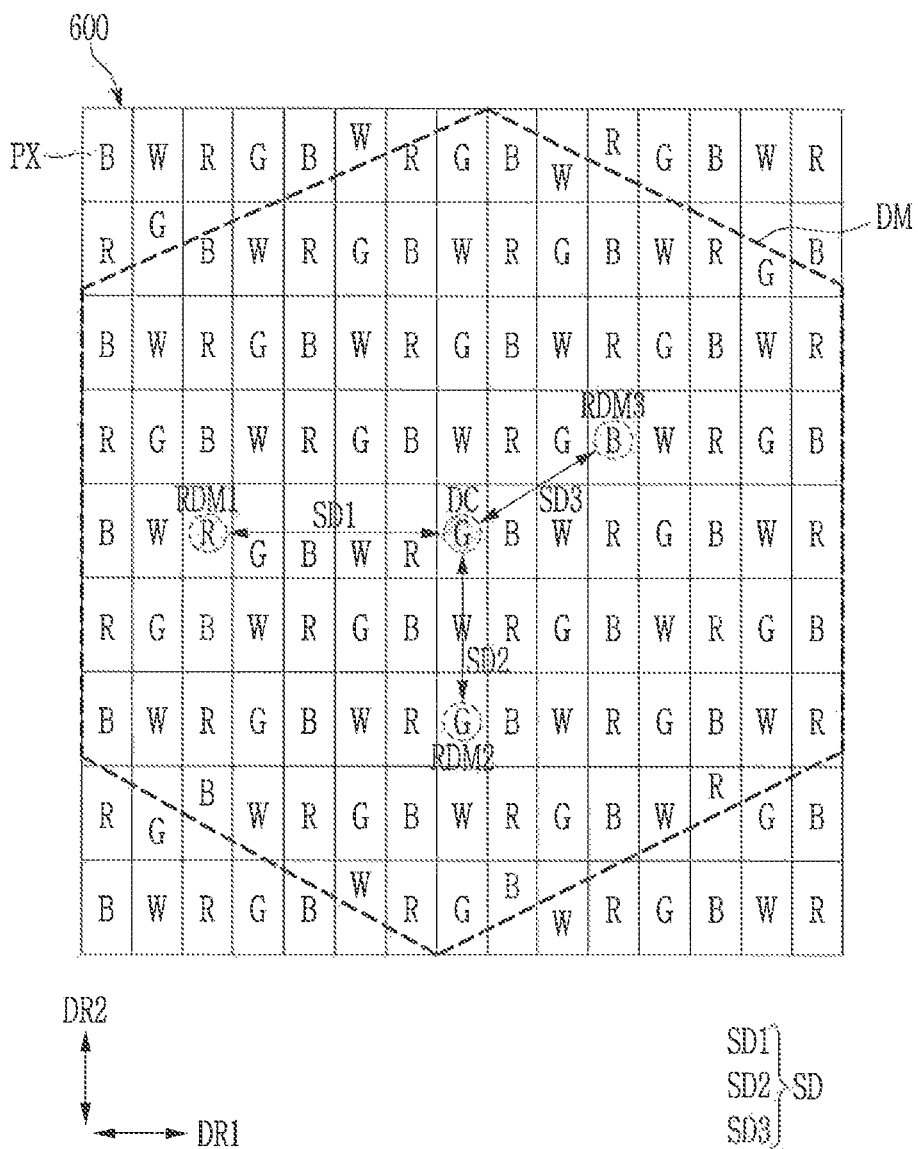
FIG. 4 shows an example of a plurality of pixels corresponding to one domain of FIG. 2.

FIG. 4 illustrates an example in which a plurality of pixels PX corresponding to one domain DM of FIG. 2.

Referring to FIG. 4, one domain DM of the lens array portion 700 may overlap two or more pixels PX of the display portion 600 on a plane, and FIG. 4 exemplarily illustrates that each domain DM overlaps about 105 pixels PX. Each of the plurality of pixels that overlap one domain DM may correspond to a different viewpoint area. Thus, in case of the embodiment of FIG. 4, an image can be displayed by dividing the image into about 105 viewpoint areas.

The pixels PX of the display portion 600 may be arranged in a matrix format by rows that are substantially parallel with the first direction DR1 and columns that are substantially parallel with the second direction DR2. Each pixel PX may display one of red R, green G, blue B, and white W colors.

Light emitted from a pixel PX located at a center of the lens ML is refracted at the smallest refraction angle (about 0 degrees) by the lens MS and is thus incident on the front viewpoint area. The center of the lens ML may corresponds to the center DC of the domain DM As the location of the pixel PX is away from the center DC of the domain DM; the refraction angle by the lens ML is increased, and thus light emitted from an edge pixel PX is incident on a side viewpoint area that is gradually away toward a side direction SD from the front viewpoint area. Here, the side direction SD may substantially match a direction of a line that connects a pixel at the center DC of the domain DM and the corresponding pixels on a plane.

For example, light emitted from a pixel located in a first position RDM1 that is at a distance from a pixel disposed at the center DC of the domain DM in the first direction DR1 is refracted by the lens ML and thus may be incident on a viewpoint area distanced in a first side direction SD1 from the front viewpoint area, and in this case, the first side direction SD1 may substantially match the first direction DR1.

In addition, light emitted from a pixel located in a second position RDM2 that is at a distance from the pixel disposed at the center DM of the domain DM in the second direction DR2 is refracted by the lens ML and is thus incident on a viewpoint area that is distanced from the front viewpoint area in a second side direction DR2, and in this case, the second side direction SD2 may substantially match the second direction DR2.

In addition, light emitted from a pixel located in a third position RDM3 that is distanced from the pixel disposed at the center DC of the domain DM in a direction between the first direction DR1 and the second direction DR2 is refracted by the lens ML and thus may be incident on a viewpoint area distanced from the front viewpoint area in a third side direction SD3, and in this case, the third side direction SD3 may substantially match a direction of a line that connects the pixel disposed at the center DC of the domain DM and the pixel disposed at the third position RDM3.

A viewing angle at a viewpoint area at a side with reference to the front viewpoint area may be approximately proportional to a distance between the pixel at the center DC of the domain DM and the corresponding pixel. That is, light emitted from a pixel may be incident on a side viewpoint area having a large viewing angle as a location of the pixel is away from the center DC of the domain DM or close to the edge of the domain DM. As described, a viewing angle of each pixel may be determined by a location of a pixel in each domain DM.

Hereinafter, referring to FIG. 5, a result of measurement of luminance of red, green, and blue displayed in a multi-view type 3D image display device according to a viewing angle will be described, and a method for solving a color failure due to a luminance ratio difference of three primary colors will be described with reference to FIG. 6.

Figure 5:
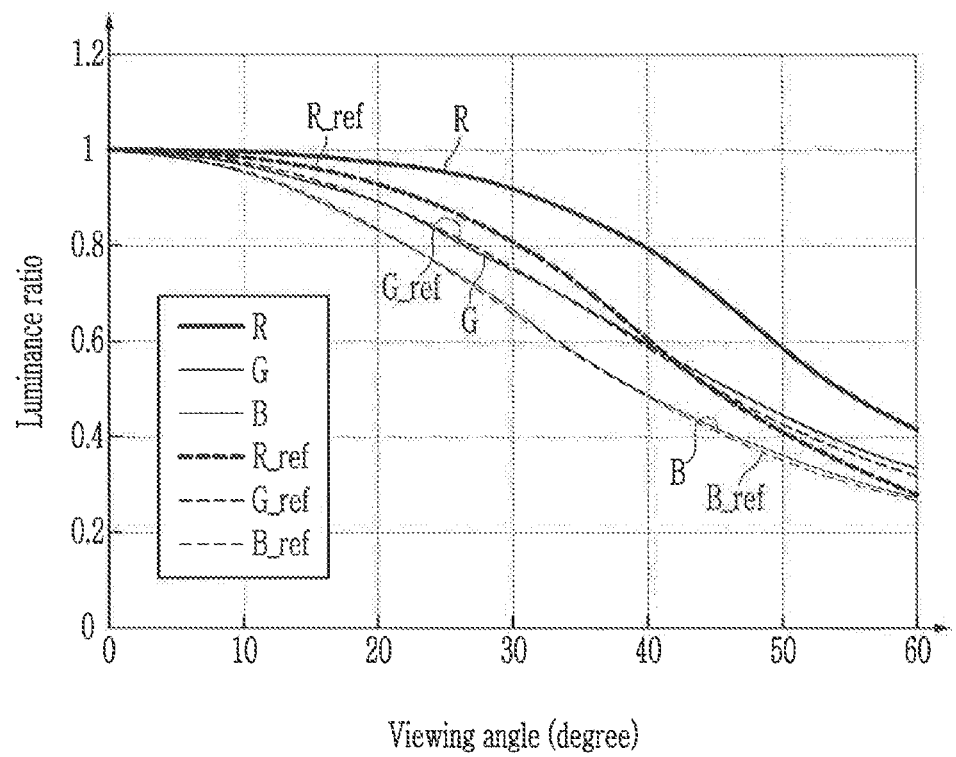
FIG. 5 shows a luminance ratio of red, green, and blue according to a viewing angle.

FIG. 5 shows a luminance ratio of red, green, and blue according to viewing angles.

Referring now to FIG. 5, luminances of red, green, and blue displayed in the multi-view type of 3D image display device measured according to viewing angles are displayed as a red, green, and blue luminance ratio with a ratio of side luminance according to a viewing angle with respect to front luminance. The front luminance may be luminance of light passing through the lens ML at a refraction angle of about 0 degrees, and the side luminance may be luminance of light refracted at a refraction angle of greater than 0 degrees. A refraction angle of light by the lens ML may correspond to a viewing angle.

A reference luminance ratio of red R_ref, green G_ref, and blue B_ref according to viewing angles of most good quality display devices is generally lower as the viewing angle increases. As the viewing angle increases, the reference luminance ratios of red R_ref, green G_ref, and blue B_ref may be different from each other, but the difference in the reference ratio is not significant so that a color displayed by the sum of the three primary colors may not be visibly different from the side compared to the front. Such a good quality display device is referred to as a reference display device.

Due to, for example, an error in a manufacturing process, luminance ratios of red R, green G, and blue B according to the viewing angles of some display devices may be changed from the reference luminance ratio. Particularly, the luminance ratios of green G and blue B are similar to the reference luminance ratios of green G_ref and blue B_ref, but a luminance ratio of red R may be greatly different from the reference luminance ratio of red R_ref. For example, the luminance ratio of red R at a viewing angle of 30 degrees may be as significant as about 0.2 or higher than the luminance ratios of green G and blue B, and accordingly, an image viewed at the viewing angle of degrees may be viewed as reddish. As a cause of such a color failure, when a thickness of a light emitting element is increased or decreased during a process for manufacturing the light emitting element of the display device, luminance of light of red R emitted to the side may be increased due to constructive interference.

To address such a color failure of an image according to a viewing angle, luminance of red R should be adjusted according to the reference luminance of red R_ref according to a viewing angle of the reference display device. This will now be described with reference to FIG. 6.

Figure 6:
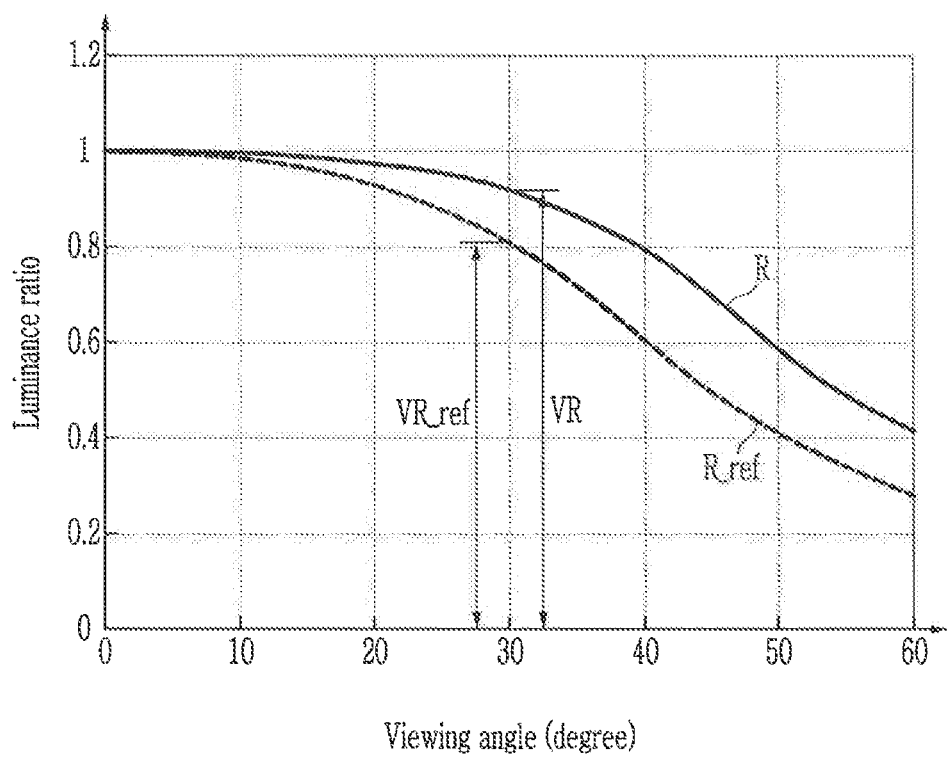
FIG. 6 is a graph provided for description of a method for compensating an input image signal according to an embodiment of the present inventive concept.

FIG. 6 is a graph provided for description of a method for compensating an input image signal according to an embodiment of the present inventive concept.

Referring now to FIG. 6, a compensation value according to the viewing angle described above with reference to FIG. 1 will be described with the luminance ratio of red R and the reference luminance ratio of red R_ref at a viewing angle of 30 degrees as an example. When a value of the luminance ratio of red R is VR and a value of reference luminance ratio of red R_red is VR_ref, a first compensation value may be determined by a ratio VR_ref/VR of a value VR of the luminance ratio of red R and a value VR_ref of the reference luminance ratio of red R_ref.

The compensation image signal ImS' may be generated by multiplying the input image signal ImS including luminance information by the first compensation value (VR_ref/VR), and red R may be displayed to be viewed with the same luminance as red displayed in the reference display device by the input data signal ImD generated based on the compensation image signal ImS'.

In FIG. 6, the method for compensating luminance of red R is described, but luminance of green G and luminance of blue B may also be compensated by using the same method. For example, a second compensation value with respect to green G is determined by a ratio of the reference luminance ratio of green G_ref with respect to a luminance ratio of green G, and the compensation image signal ImS' can be generated by multiplying the input image signal ImS including luminance information of green G by the second compensation value. In addition, a third compensation value with respect to blue B is determined by a ratio of the reference luminance ratio of blue B_ref with respect to the luminance ratio of blue B, and the compensation image signal ImS can be generated by multiplying the input image signal ImS including luminance information of blue B by the third compensation value.

The compensation value may be stored in the data compensation circuit 150 as a lookup table where compensation values calculated according to viewing angles and summarized as compensation values with respect to the viewing angles. The data compensation circuit 150 may generate the compensation image signal ImS' by applying a compensation value corresponding to a viewing angle that corresponds to a location of a pixel to the input image signal ImS. Alternatively, since a viewing angle corresponds to a location of a pixel, the lookup table LUT where compensation values with respect to locations of the plurality of pixels are summarized may be stored in the data compensation circuit 150, and the data compensation circuit 150 may generate a compensation image signal ImS' by applying the compensation value with respect to the locations of the pixels to the input image signal ImS.

Hereinafter, referring to FIG. 7 to FIG. 9, another method for compensating an input video signal will now be described.

Figure 7:
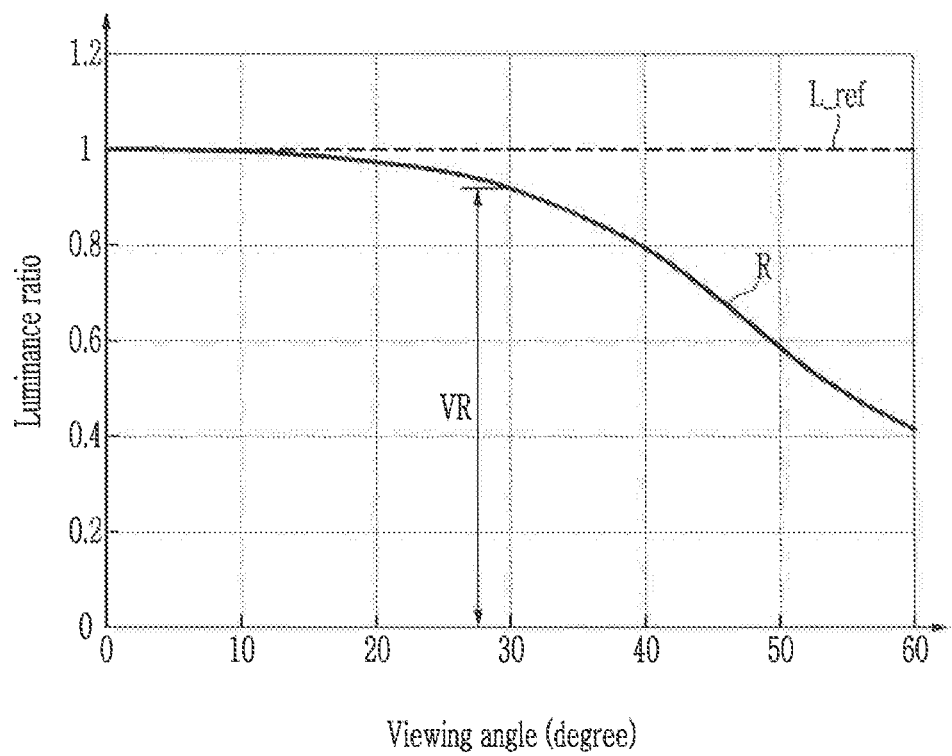
Figure 8:
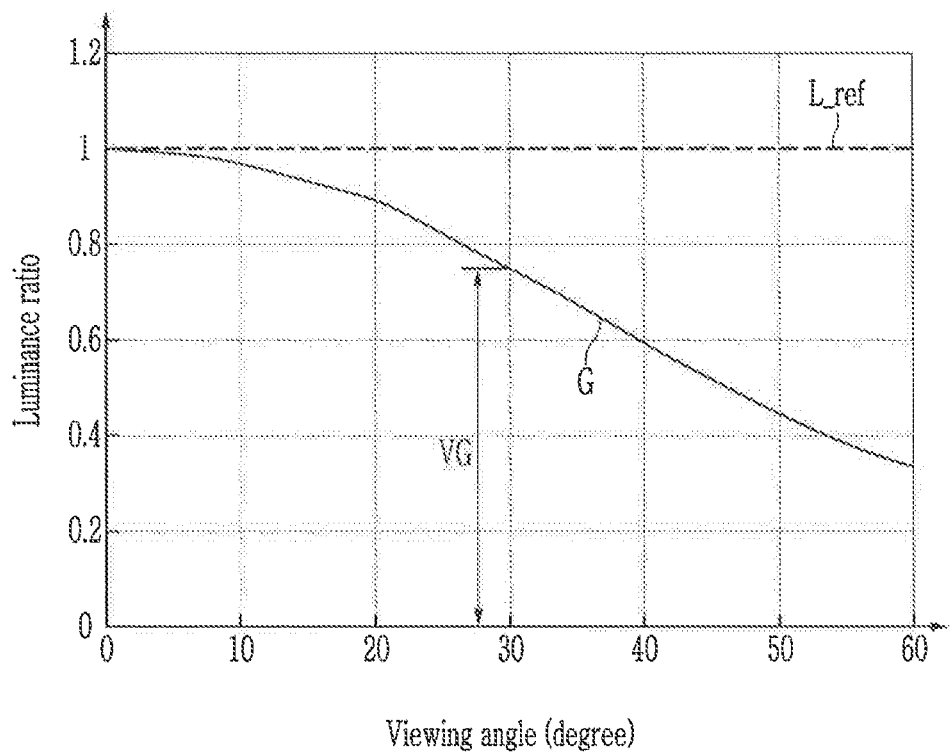
Figure 9:
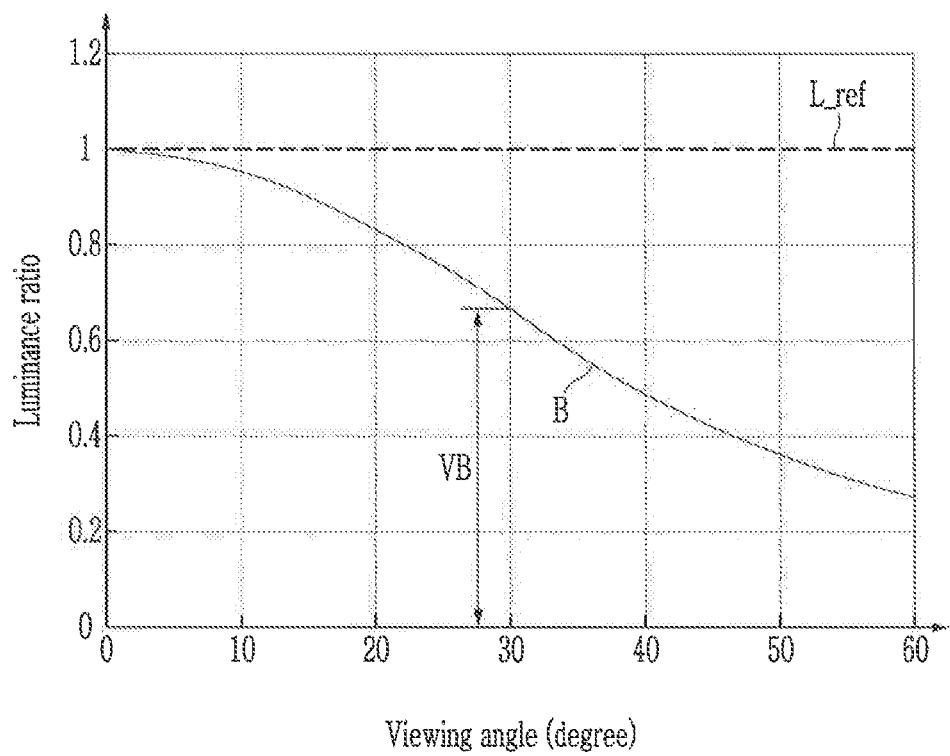

FIG. 7 to FIG. 9 are graphs provided for description of a method for compensating an input image signal according to an embodiment of the present inventive concept. For example, in an embodiment of the present inventive concept, FIG. 7 shows values of a luminance ratio versus a viewing angle for red; FIG. 8 shows values of a luminance ratio versus a viewing angle for green; and FIG. 9 shows values of a luminance ratio versus a viewing angle for blue.

Referring now to FIG. 7 to FIG. 9, a first compensation value with respect to red R, a second compensation value with respect to green G, and a third compensation value with respect to B may be determined to maintain luminance of each of red R, green G, and blue B according to viewing angles to be equal to a reference luminance ratio L_ref of the front.

The first compensation value with respect to red R is determined by a ratio L_ref/VR of the reference luminance ratio L_ref of the front with respect to a value VR of a luminance ratio of red R. Since the reference luminance ratio L_ref of the front is 1, the first compensation value with respect to red R may be 1/VR, which is an inverse value of the value VR of the luminance ratio of red R.

The second compensation value with respect to green G is determined by a ratio L_ref/VG of the reference luminance ratio L_ref of the front with respect to a value VG of a luminance ratio of green G. Since the reference luminance ratio L_ref of the front is 1, the second compensation value with respect to green G may be 1/VG, which is an inverse value of the value VG of the luminance ratio of green G.

The third compensation value with respect to blue B is determined by a ratio L_ref/VB of the reference luminance ratio L_ref of the front with respect to a value VB of a luminance ratio of blue B. Since the reference luminance ratio L_ref of the front is 1, the third compensation value with respect to blue B may be 1/VB, which is an inverse value of the value VB of the luminance ratio of blue B.

As shown in FIG. 7 to FIG. 9, the value VR of the luminance ratio of red R, the value VG of the luminance ratio of green G, and the value VB of the luminance ratio of blue B may be gradually decreased as the viewing angle is increased. The value VB of the luminance ratio of blue B is set to a maximum according to the viewing angle, and the value VR of the luminance ratio of red R may be reduced to a minimum according to the viewing angle. Accordingly, the third compensation value (1/VB) may be greater than or equal to the second compensation value (1/VG), and the second compensation value (1/VG) may be greater than or equal to the first compensation value (1/VR).

The compensation image signal ImS' may be generated by multiplying the input image signal ImS including luminance information by the first compensation value (1/VR), and red R may be displayed to be viewed with the same luminance as the front reference luminance at the side viewpoint area by the image data signal ImD generated based on the compensation image signal ImS'.

In addition, the compensation image signal ImS' may be generated by multiplying the input image signal ImS including luminance information by the second compensation value (1/VG), and green G may be displayed to be viewed with the same luminance as the front reference luminance at the side viewpoint area by the image data signal ImD generated based on the compensation image signal ImS'.

Further, the compensation image signal ImS' may be generated by multiplying the input image signal ImS including luminance information by the third compensation value (1/VB), and blue B may be displayed to be viewed with the same luminance as the front reference luminance at the side viewpoint area by the image data signal ImD generated based on the compensation image signal ImS'.

Accordingly, the luminance of an image is not decreased according to viewing angles, and thus the image can be viewed with the same luminance as the front luminance.

Hereinafter, referring to FIG. 10, a lens array portion including a plurality of lenticular lenses will be described, and a method for compensating a 3D image displayed through the lenticular lenses will be described with reference to FIG. 11.

Figure 10:
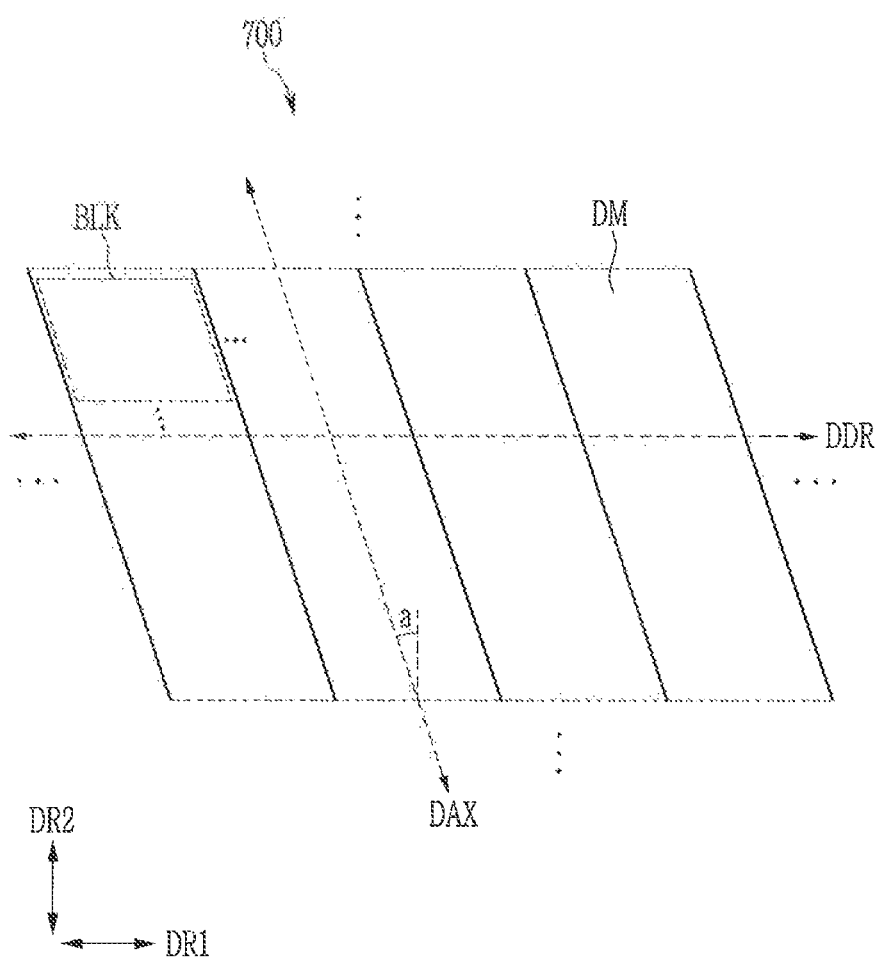
FIG. 10 shows a lens array portion according to the an embodiment inventive concept.

FIG. 10 shows a lens array portion according to an embodiment of the inventive concept. FIG. 11 shows a plurality of pixels corresponding to one domain of FIG. 10.

Figure 11:
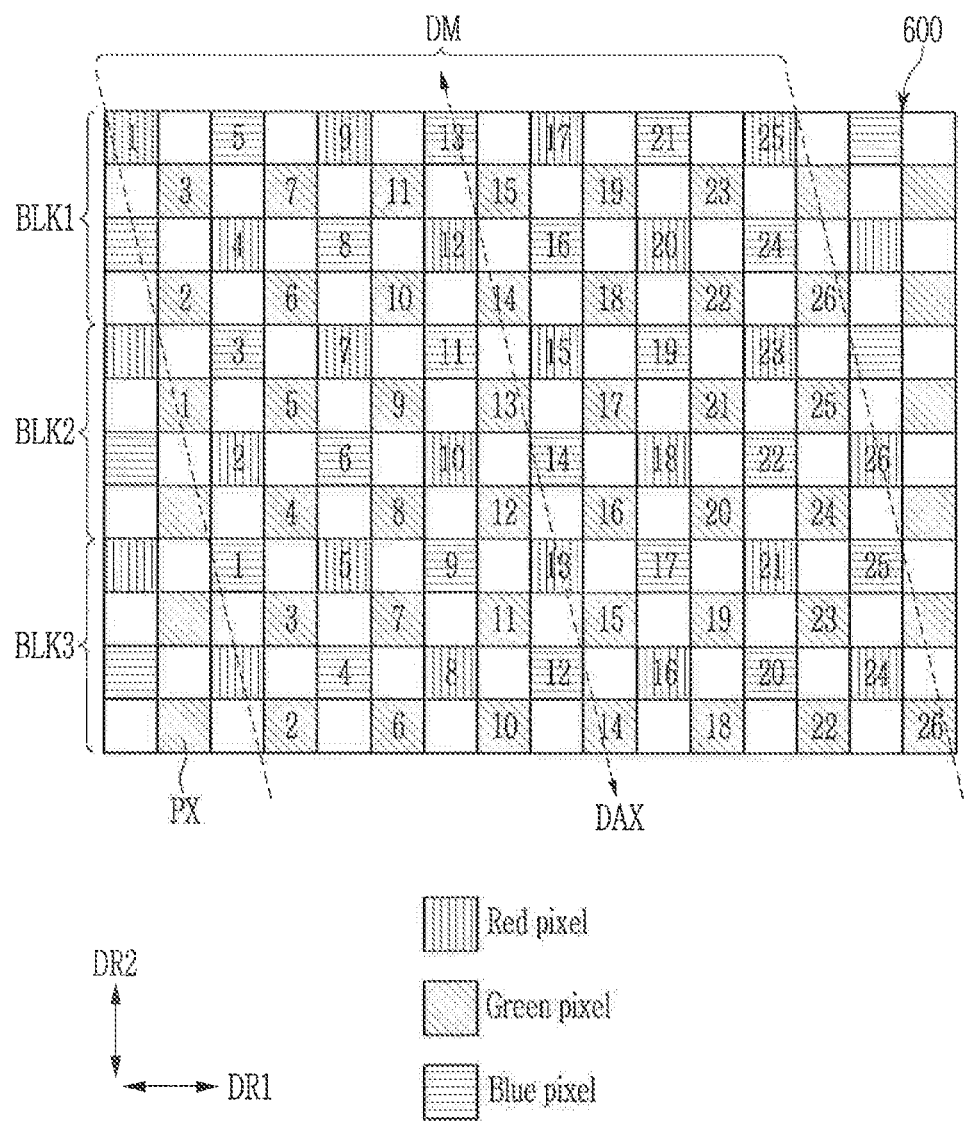
FIG. 11 shows a plurality of pixels corresponding to one domain of FIG. 10.

Referring to FIG. 10 and FIG. 11, a lens array portion 700 may be partitioned into a plurality of domains DM that are sequentially disposed in a first direction DR1 on a plane that is parallel with the first direction DR1 and a second direction DR2. The plurality of domains DM may be adjacent to each other in a domain direction DDR that is the same as the first direction DR1. The plurality of domains DM in a shape that extends along a center axis DAX of a domain DM that is slanted at a predetermined angle a with respect to the second direction DR2, and an interface between the plurality of domains DM may be slanted at the predetermined angle a with respect to the second direction DR2. The lens array portion 700 includes a plurality of lenticular lenses corresponding to the plurality of domains DM, and each of the plurality of lenticular lenses may provide local focusing to the corresponding single domain DM.

Each domain DM includes a plurality of block areas BLK, the plurality of block areas BLK overlap two or more pixels PX of a display portion 600, and light of an image displayed by pixels PX overlapping each block area BLK may pass through the corresponding block area BLK. Light incident from pixels PX corresponding to each block area BLK may travel in different directions by being refracted at different angles depending on incident locations in the block area BLK, and pixels PX corresponding to each block area BLK may display an image corresponding to different viewpoint areas. The plurality of block areas BLK included in one domain DM may be arranged in a row along the center axis DAX of the domain DM. Alternatively, the plurality of block areas BLK included in one domain MD may be arranged in a row along the second direction DR2.

When a display device 10 is viewed on a cross-section formed by the domain direction DDR and the third direction DR3, a 3D image can be viewed by a viewer as shown in FIG. 3. A detailed description of this will be omitted.

FIG. 11 shows an example that one block area BLK included in one domain DM overlaps about 26 pixels PX on a plane. Each of the plurality of pixels PX overlapping one block area BLK may correspond to different viewpoint areas, and therefore, in case of the embodiment shown in FIG. 11, the display device 10 may display an image by dividing the image into about 26 viewpoint areas. As shown in FIG. 11, a first block area BLK1, a second block area BLK2, and a third block area BLK3 respectively overlap 26 pixels PX. The pixels PX overlapping the respective block areas BLK1, BLK2, and BLK3 correspond to different viewpoint areas. In FIG. 11, a number in each pixel indicates a viewpoint area.

The pixels PX of the display portion 600 may be arranged in a matrix format along rows that are substantially parallel with the first direction DR1 and columns that are substantially parallel with the second direction DR2. In addition, red pixels and blue pixels may be alternately arranged at intervals of two columns in one row and green pixels may be alternately arranged at intervals of two columns in the next consecutive row. In this case, the green pixels may be arranged in different columns from the red and blue pixels. A portion where the red pixel, the green pixel, and the blue pixel are not disposed is an area where light is blocked by a light blocking member.

Light emitted from pixels (e.g., pixel 13 and pixel 14) that are disposed the most adjacent to the center axis DAX of the domain DM is refracted by the smallest refraction angle by a lens and is thus incident on a viewpoint area of almost the front, but as the location of the pixel PX is away from the center axis DAX, a refraction angle of the lens is increased so that light emitted from the pixel that is away from the center axis DAX is incident on a viewpoint area at a side that is away from the front viewpoint area in the domain direction DDR. A viewing angle at the side viewpoint area corresponds to a view angle from the center axis DAX of the domain DM to the domain direction DDR (or the first direction DR1) between the corresponding pixels, and may be substantially proportional to a distance between the center axis DAX of the domain DM to the domain direction DDR between the corresponding pixels.

As described herein above, when the lens array portion 700 includes a plurality of lenticular lenses, a plurality of viewpoint areas where different images are displayed may be formed in the first direction DR1. In such a case, as previously described with reference to FIG. 5 to FIG. 9, a compensation value according to a viewing angle is calculated and a compensation image signal ImS' is generated by applying the compensation value to an input image signal ImS to thereby prevent color failure and luminance deterioration in an image according to a viewing angle. As this embodiment is the same or similar as the method described with reference to FIG. 5 to FIG. 9, and therefore no further description will be provided.

Figure 12:
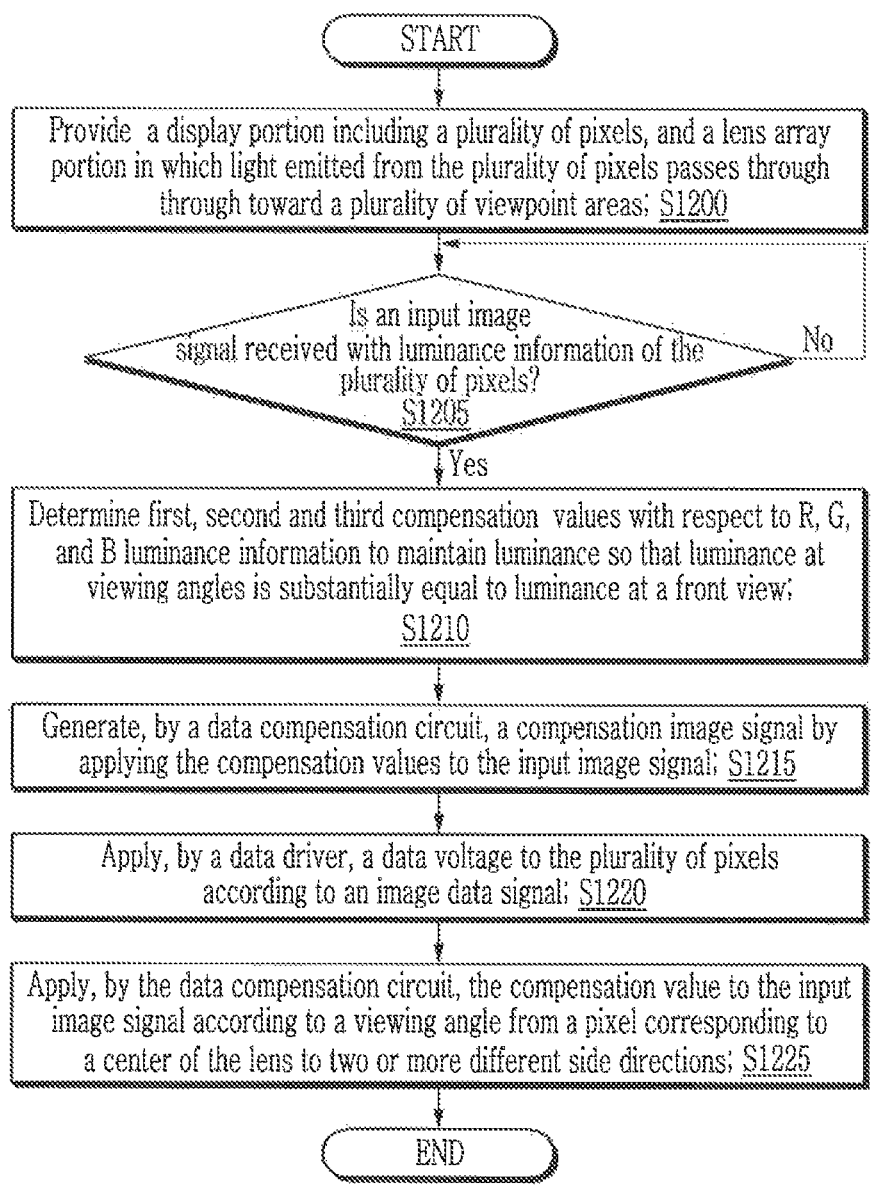
FIG. 12 is a flowchart providing an overview of a method of display by a display device according to an embodiment of the inventive concept.

FIG. 12 is a flowchart providing an overview of a method of display by a display device according to an embodiment of the inventive concept. The display device 10 may have a structure as discussed herein above in accordance with FIGS. 1 through 11.

At operation S1200, a display portion 600 is provided including a plurality of pixels, typically R, G and B, although the inventive concept is not limited thereto. In addition a lens array 700 portion such as shown in FIG. 2 may be provided. An artisan should understand and appreciate that with regard to the lens array portion, there may be provided a lens sheet including a plurality of microlenses or a plurality of lenticular lenses providing local focusing with respect to a pixel group including two or more pixels, or the lens array portion 700 may be a switchable lens panel that can form a plurality of microlenses or a plurality of lenticular lenses. The light emitted from the plurality of pixels pass through the lenses toward a plurality of viewpoint areas.

At operation S1205, it is determined whether an input image signal is received with luminance information about the plurality of pixels. If the input image signal is not received, the method continues to wait for an input image signal to be received prior to proceeding.

At operation S1210, first, second and third compensation values may be determined by the data compensation circuit. The compensation values are determined with respect to luminance information so that the luminance at various viewing angles is substantially equal to the luminance when the image is viewed at a front view. For example, in the event the viewing angle is 30 degrees, the luminance of each of the respective R, G and B pixels will typically appear less bright than when directly viewed in a front position (e.g. a viewing angle of about zero degrees), and each color may have different compensation values as discussed above and, for example as shown in the luminance ratios v. viewing angles in FIG. 5, and FIGS. 6 through 9. An artisan should understand and appreciate that such compensation values may have been previously calculated and stored in memory, for example, a lookup table. Thus, the compensation values for a given viewing angle may be retrieved from the lookup table.

The compensation values are such that the luminance at viewing angles with the compensation value will be substantially equal to the luminance of the image at a front view.

At operation S1215, the data compensation circuit may generate a compensation image signal by applying the compensation values to the input image signal.

At operation S1220, a data voltage may be applied to the plurality of pixels according to an image signal, and at operation S1225, the data compensation circuit 150, may apply the compensation value to the input image signal according to a view angle from a pixel 13 corresponding to a center of the lens to two or more different side directions. For example, the applying of the compensation signal may occur by multiplying an input image signal including luminance information of a particular color (e.g., red) by the first compensation value.

The process will continue to provide compensation while input image signals are being received.

While the inventive concept has been described in connection with practical embodiments, it is to be understood by a person of ordinary skill in the art that the inventive concept is not limited to the embodiments disclosed herein, but, on the contrary, is intended to cover various modifications and equivalent arrangements included within the spirit and scope of the appended claims. It will be understood by those skilled in the art that various changes in form and detail may be made without departing from the scope of the present inventive concept. Accordingly, the true scope of the present inventive concept should be determined by the technical idea of the appended claims.

What is claimed is:

1. A display device comprising:
   a display portion including a plurality of pixels;
   a lens array portion in which light emitted from the plurality of pixels passes through toward a plurality of viewpoint areas from which an image is viewed;
   a data compensation circuit configured to generate a compensation image signal by application of a compensation value to an input image signal according to a viewing angle from which the image is viewed, and the input image signal includes luminance information of the plurality of pixels; and
   a data driver configured to apply a data voltage to the plurality of pixels according to an image data signal generated based on the compensation image signal generated by the data compensation circuit,
   wherein the lens array portion comprises a lens that provides local focusing to two or more pixels, and
   wherein the data compensation circuit applies the compensation value to the input image signal according to a viewing angle from a pixel corresponding to a center of the lens to two or more different side directions.

2. The display device of claim 1, wherein the plurality of pixels are arranged in a matrix format along rows that are substantially parallel with a first direction and columns that are substantially parallel with a second direction, and
   wherein the two or more different side directions comprise a first side direction that matches the first direction in which rows of pixels are arranged and a second side direction that matches the second direction in which columns of pixels are arranged.

3. The display device of claim 2, wherein the two or more different side directions further include a third side direction between the first direction and the second direction.

4. The display device of claim 1, wherein each of the two or more different side directions includes a direction of a line that connects a pixel disposed at the center of the lens and other pixels included in a domain corresponding to the lens.

5. The display device of claim 4, wherein the viewing angle is proportional to a distance between the pixel disposed at the center of the lens and the other pixels.

6. The display device of claim 1, wherein the compensation value includes a first compensation value determined according to a ratio of a reference luminance ratio with respect to a luminance ratio of red, the reference luminance ratio comprises a ratio of a side luminance according to a viewing angle with respect to a front luminance of a reference display device, and the luminance ratio is the side luminance according to a viewing angle with respect to the front luminance of the display device.

7. The display device of claim 6, wherein the data compensation circuit generates the compensation image signal by multiplication of an input image signal including luminance information of red by the first compensation value.

8. The display device of claim 7, wherein the compensation value further comprises:
a second compensation value determined according to a ratio of a reference luminance ratio with respect to a luminance ratio of green; and
a third compensation value determined according to a ratio of a reference luminance ratio with respect to a luminance ratio of blue.

9. The display device of claim 8, wherein the data compensation circuit generates the compensation image signal by multiplying an input image signal including luminance information of green by the second compensation value and multiplying an input image signal including luminance information of blue by the third compensation value.

10. The display device of claim 8, further comprising a lookup table in which the data compensation circuit stores one or more compensation values with respect to viewing angles in a lookup table.

11. The display device of claim 8, further comprising a lookup table in which the data compensation circuit stores one or more compensation values with respect to locations of each of the respective pixels of the plurality of pixels.

12. The display device of claim 1, wherein the compensation value comprises:
a first compensation value comprising an inverse value of a luminance ratio of red;
a second compensation value comprising an inverse value of a luminance ratio of green; and
a third compensation value comprising an inverse value of a luminance ratio of blue, and
each of the luminance ratio of red, green and blue is a ratio of side luminance according to a viewing angle with respect to front luminance of the display device.

13. The display device of claim 12, wherein the third compensation value is greater than or equal to the second compensation value, and the second compensation value is greater than or equal to the first compensation value.

14. The display device of claim 12, wherein the data compensation circuit generates the compensation image signal by multiplying an input image signal including luminance information of red by the first compensation value, multiplying an input image signal including luminance information of green by the second compensation value, and multiplying an input image signal including luminance information of blue by the third compensation value.

15. A display device comprising:
a display portion including a plurality of pixels;
a lens array portion in which light emitted from the plurality of pixels passes through toward plurality of viewpoint areas from which an image is viewed;
a data compensation circuit configured to generate a compensation image signal by application of a compensation value to an input image signal according to a viewing angle from which the image is viewed, and the input image signal includes luminance information of the plurality of pixels; and
a data driver configured to apply a data voltage to the plurality of pixels according to an image data signal generated based on the compensation image signal generated by the data compensation circuit,
wherein the lens array portion comprises a lens that provides a local focusing to two or more pixels and a domain corresponding to the lens overlaps two or more pixels, and the lens array portion comprises a plurality of block areas arranged in a row along a center axis of the domain and pixels corresponding to each block area display an image corresponding to different viewpoint areas, and
the compensation value comprises a first compensation value determined by a ratio of a reference luminance ratio with respect to a luminance ratio of red, the reference luminance ratio is a ratio of a side luminance according to a viewing angle with respect to a front luminance of a reference display device, and the luminance ratio is a ratio of side luminance according to a viewing angle with respect to front luminance of the display device.

16. The display device of claim 15, wherein the data compensation circuit generates the compensation image signal by multiplying an input image signal including luminance information of red by the first compensation value.

17. The display device of claim 16, wherein the compensation value further comprises:
a second compensation value determined by a ratio of a reference luminance ratio with respect to a luminance ratio of green; and
a third compensation value determined by a reference luminance ratio with respect to a luminance ratio of blue.

18. The display device of claim 17, wherein the data compensation circuit generates the compensation image signal by multiplying an input image signal including luminance information of green by the second compensation value and multiplying an input image signal including luminance information of blue by the third compensation value.

19. The display device of claim 15, wherein the compensation value comprises:
a first compensation value which is an inverse value of the luminance ratio of red;
a second compensation value which is an inverse value of a luminance ratio of green; and
a third compensation value which is an inverse value of a luminance ratio of blue, and
the luminance ratio is a ratio of side luminance according to a viewing angle with respect to front luminance of the display device.

20. The display device of claim 19, wherein the third compensation value is greater than or equal to the second compensation value, and the second compensation value is greater than or equal to the first compensation value.

21. A method of operating a display device, comprising:
providing a display portion including a plurality of pixels, and a lens array portion in which light emitted from the plurality of pixels passes through toward a plurality of viewpoint areas from which an image is viewed;
determining, by a data compensation circuit, a compensation image signal according to a viewing angle from which the image is viewed, in which an input image signal includes luminance information of the plurality of pixels; and
applying, by a data driver, a data voltage to the plurality of pixels according to an image data signal;
locally focusing, by a lens of the lens array portion, two or more pixels of the plurality of pixels, and
applying, by the data compensation circuit, a compensation value to the input image signal according to a viewing angle from a pixel corresponding to a center of the lens to two or more different side directions.

22. The method according to claim 21, wherein the determining of the compensation image signal include retrieving the compensation value to be applied to the input image signal from a lookup table in a memory.

* * * * *